No. 613,575. Patented Nov. 1, 1898.
E. D. KELLERMAN.
MATCH BOX.
(Application filed Jan. 12, 1898.)
(No Model.)
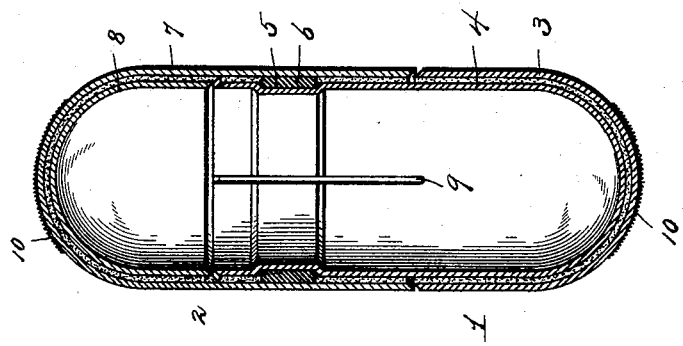
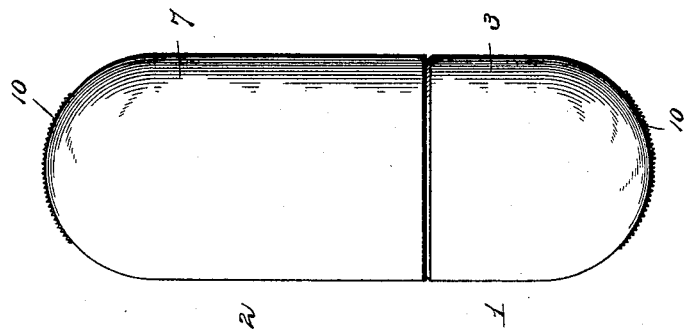
Witnesses
Harry L. Amer.
K. A. Hau
Inventor
Ellsworth D. Kellerman.
by V. D. Stockbridge
Attorney

UNITED STATES PATENT OFFICE.

ELLSWORTH D. KELLERMAN, OF MONTESANO, WASHINGTON.

MATCH-BOX.

SPECIFICATION forming part of Letters Patent No. 613,575, dated November 1, 1898.

Application filed January 12, 1898. Serial No. 666,418. (No model.)

*To all whom it may concern:*

Be it known that I, ELLSWORTH D. KELLERMAN, a citizen of the United States, residing at Montesano, in the county of Chehalis and State of Washington, have invented certain new and useful Improvements in Match-Boxes; and I do hereby declare the following to be a full, clear, and exact description of the invention, such as will enable others skilled in the art to which it appertains to make and use the same.

My invention relates to match-boxes, the object of the same being to provide a receptacle for containing matches which is adapted to be carried in the pocket and is impervious to moisture.

The invention consists of a box or receptacle comprising two telescoping members, both of which are made of a plurality of layers of material, the inner layer of one extending beyond the outer layer thereof formed with longitudinally-extending slits and provided with an external groove or recess, a packing-ring or gasket fitting within said groove or recess, and the outer layer of the other extending beyond the inner layer thereof, the ends of the layers of each part being beveled and the inner and outer layers of one engaging, respectively, the inner and outer layers of the other for limiting the inward movement of said members and forming close joints between them for assisting in preventing the entrance of moisture.

In the drawings, Figure 1 is a side elevation of my box, showing the two parts thereof in their closed positions. Fig. 2 is a vertical longitudinal section.

Like reference-numerals indicate like parts in the two views.

My improved box or receptacle is made up of two telescoping members, a body 1 and a cover 2, the same being elliptical, circular, or other suitable shape in cross-section. The body 1 is formed of an outer layer 3 and an inner layer 4, of sheet metal, soldered, riveted, or otherwise secured together, the inner layer 4 projecting beyond the end of the outer layer 3. The upper edges of the layers 3 and 4 are beveled, as shown, and the inner layer 4 is further provided with an external groove or recess 5 for the reception of the gakset or packing-ring 6, constructed of felt, rubber, leather, or other suitable material for the purpose. The top 2 is similarly formed of an outer layer 7 and an inner layer 8, of sheet metal, also soldered or otherwise suitably secured together, the outer layer 7 of said top projecting beyond the end of the inner layer 8, and the edges of both layers 7 and 8 being beveled, as clearly shown. The inner layer 4 of the body 1 is provided with longitudinally-extending slits 9, which serve to permit of the compression of the upper ends thereof. I may also provide upon the rounded ends of the two members of the box a roughened portion 10, by means of which the matches may be ignited.

By the construction described it will be observed that a close joint is made between the gasket or packing-ring 6 in the inner layer 4 and the outer layer 7 of the lid of the top or cover 2. It will also be observed that by reason of the registering beveled ends of the inner and outer layers of the body 1 and the top or cover 2 close joints are formed between these two parts of the box which will serve to assist in preventing the entrance of moisture to the interior. Stops are also provided by the construction described, which limit the inward movement of the two members of the box.

Having now described the invention, what I claim as new is—

A box or receptacle comprising two telescoping members, both of which are made of a plurality of layers of material, the inner layer of one extending beyond the outer layer thereof, formed with longitudinally-extending slits and provided with an external groove or recess, a packing-ring or gasket fitting within said groove or recess, and the outer layer of the other extending beyond the inner layer thereof, the ends of the layers of each part being beveled and the inner and outer layers of one engaging respectively the inner and outer layers of the other for limiting the inward movement of said members and forming close joints between them for assisting in preventing the entrance of moisture.

In testimony whereof I affix my signature in presence of two witnesses.

ELLSWORTH D. KELLERMAN.

Witnesses:
 G. W. NINEMIN,
 THOS. MORGAN.